US008882407B2

(12) United States Patent
Agic

(10) Patent No.: US 8,882,407 B2
(45) Date of Patent: Nov. 11, 2014

(54) INDEXABLE CUTTING INSERT

(75) Inventor: Adnan Agic, Fagersta (SE)

(73) Assignee: Seco Tools AB, Fagersta (SE)

( * ) Notice: Subject to any disclaimer, the term of this patent is extended or adjusted under 35 U.S.C. 154(b) by 231 days.

(21) Appl. No.: 13/161,190

(22) Filed: Jun. 15, 2011

(65) Prior Publication Data

US 2012/0027530 A1 Feb. 2, 2012

(30) Foreign Application Priority Data

Jul. 27, 2010 (EP) .................................. 10007763

(51) Int. Cl.
*B23C 5/20* (2006.01)
*B23C 5/10* (2006.01)

(52) U.S. Cl.
CPC .................. *B23C 5/207* (2013.01); *B23C 5/109* (2013.01); *B23C 2200/0433* (2013.01); *B23C 2200/367* (2013.01); *B23C 2210/168* (2013.01); *B23C 2210/203* (2013.01)
USPC .............................. 407/113; 407/42; 407/114

(58) Field of Classification Search
CPC .............. B23C 2200/125; B23C 5/207; B23C 2200/085; B23C 2200/205; B23C 2200/203; B23C 5/08; B23C 5/109; B23C 5/2204; B23C 5/2221; B23B 27/143; B23B 27/141
USPC ................. 407/42, 48, 61, 113, 114
See application file for complete search history.

(56) References Cited

U.S. PATENT DOCUMENTS

| 3,981,057 | A | 9/1976 | Koppers |
| 5,314,269 | A | 5/1994 | Arai et al. |
| 7,241,082 | B2 | 7/2007 | Smilovici et al. |
| 2007/0071561 | A1 | 3/2007 | Agic |
| 2009/0155004 | A1 | 6/2009 | Jansson |
| 2009/0155005 | A1 | 6/2009 | Jansson |
| 2010/0119313 | A1* | 5/2010 | Hartlohner et al. ........... 407/103 |
| 2010/0129166 | A1* | 5/2010 | Hartlohner et al. ........... 407/102 |
| 2010/0158620 | A1* | 6/2010 | Spitzenberger et al. ........ 407/40 |

FOREIGN PATENT DOCUMENTS

| CN | 191262974 A | 9/2009 |
| DE | 102006017458 A1 | 9/2007 |
| JP | 10118824 A * | 5/1998 |
| JP | 2008018515 A * | 1/2008 |
| JP | 2010089250 A | 4/2010 |
| WO | 2007149035 A1 | 12/2007 |
| WO | 2008002204 A1 | 1/2008 |
| WO | 2008138413 A1 | 11/2008 |
| WO | 2009075633 A1 | 6/2009 |

OTHER PUBLICATIONS

English abstract of JP 2008018515A.*
English machine translation of JP 10118824.*
International Search Report from corresponding International App. PCT/EP2011/059753.
European Search Report from corresponding European App. 10007763.
Chinese Official Action (Aug. 22, 2014) for corresponding Chinese App. 201180036723.1.

* cited by examiner

*Primary Examiner* — Andrea Wellington
*Assistant Examiner* — Alan Snyder
(74) *Attorney, Agent, or Firm* — WRB-IP LLP

(57) ABSTRACT

A cutting insert is provided including at least three cutting edges, each cutting edge including a primary cutting edge. Each primary cutting edge is associated with a respective different side surface of the cutting insert, each side surface having a respective rake surface and a clearance surface. The clearance surface is of varying width.

19 Claims, 5 Drawing Sheets

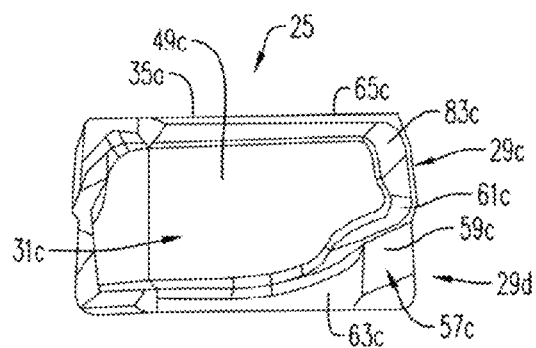
FIG. 3D
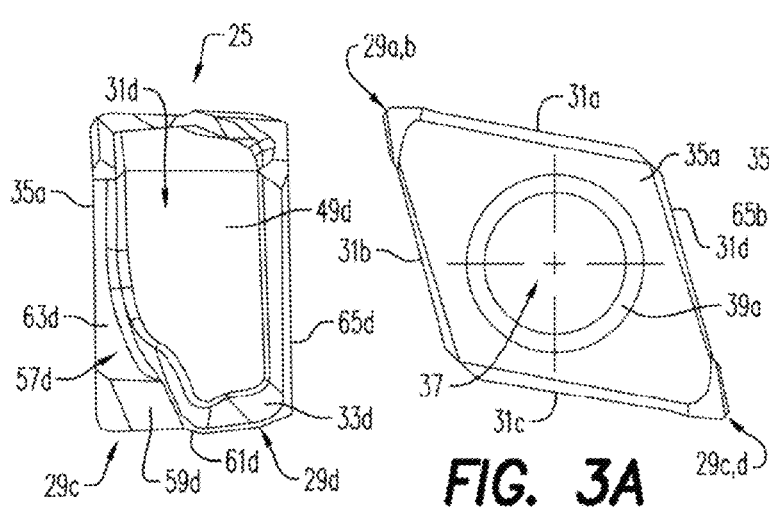
FIG. 3E
FIG. 3A
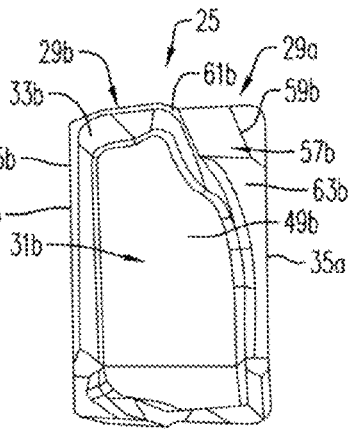
FIG. 3C
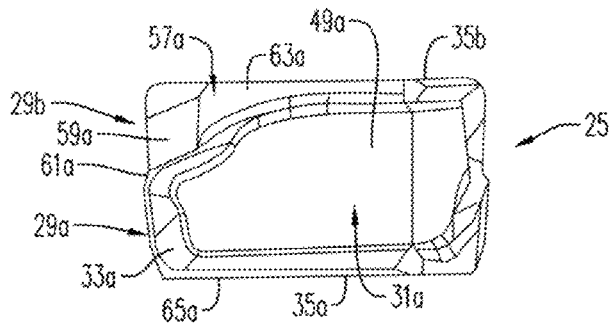
FIG. 3B

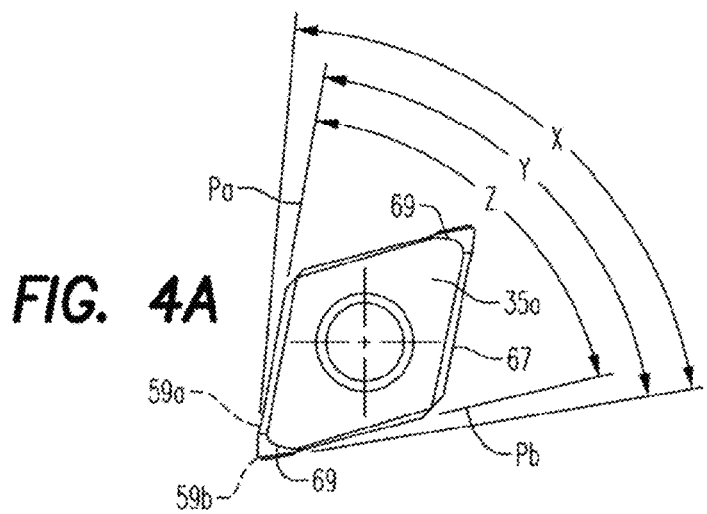
FIG. 4A
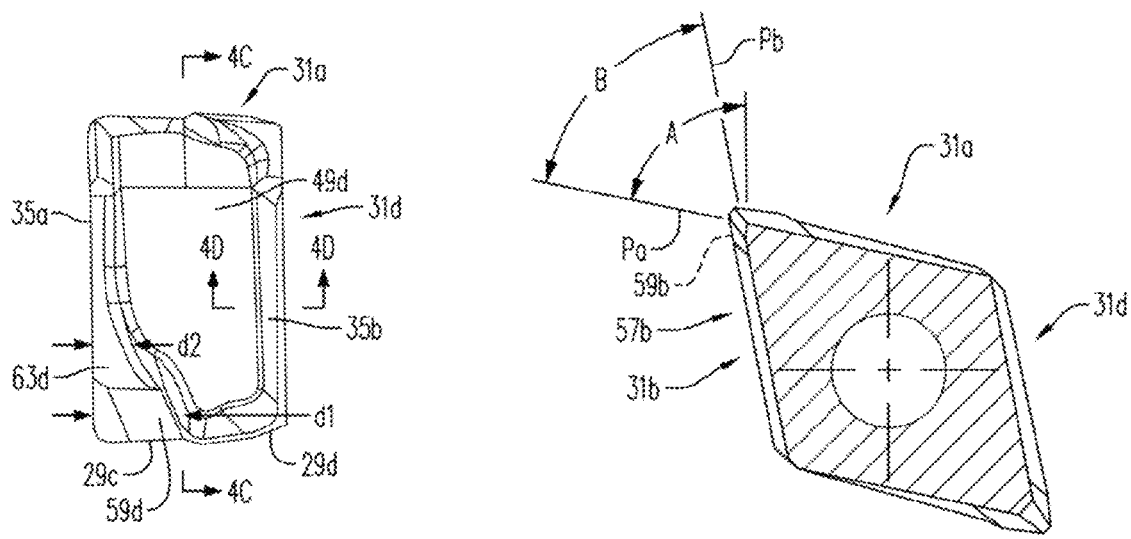
FIG. 4B
FIG. 4C
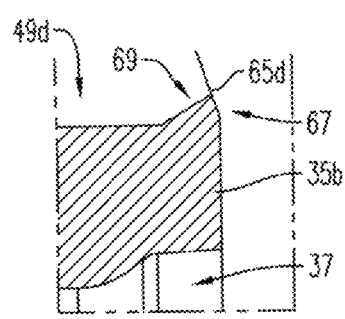
FIG. 4D

INDEXABLE CUTTING INSERT

BACKGROUND AND SUMMARY

The present invention relates generally to cutting tools and cutting inserts and, more particularly, to indexable cutting inserts and cutting tools that use them.

For applications such as milling metal, replaceable cutting inserts reduce the time needed to fix broken cutting edges on a tool. Indexable cutting inserts permit the same cutting insert to be "indexed" to expose a plurality of different cutting edges so that, after one edge is worn or broken, another edge can be used without the need to get a new insert. It is desirable to provide cutting inserts that are indexable a large number of times to extend the working life of the insert. Because the insert must be securely supported relative to a toolholder to which it is mounted, usually along three supporting surfaces of a multiple surface insert and with a clamp such as a bolt, a substantial amount of the surface area of the insert must be dedicated to supporting the insert, often limiting the number of ways that the insert can be indexed. For certain machining applications, small cutting inserts are required, or small toolholders must be used which require small cutting inserts. In such applications, it can be difficult to provide an insert that is indexable to multiple positions because of the limited amount of surface area available on the insert. It can also be difficult to provide adequate reinforcement for the cutting edges of such inserts because the configurations used for reinforcing the cutting edges use up substantial surface area of the insert. US 2007/0071561, WO 2008/002204 and JP2010089250, all disclose cutting inserts comprising clearance surfaces of substantially constant width. U.S. Pat. No. 3,981,057 discloses a cutting insert comprising three primary cutting edges.

It is desirable to provide an indexable insert configuration that facilitates provision of multiple cutting edges on an insert having little surface area. It is also desirable to provide an indexable cutting insert wherein cutting edges of the insert are provided with substantial reinforcement in a manner that minimizes the use of insert surface area.

In accordance with an aspect of the present invention, a cutting insert is provided comprising at least three cutting edges, each cutting edge including a primary cutting edge, characterized in that each primary cutting edge is associated with a respective different side surface of the cutting insert, each side surface having a respective rake surface.

BRIEF DESCRIPTION OF THE DRAWINGS

The features and advantages of the present invention are well understood by reading the following detailed description in conjunction with the drawings in which like numerals indicate similar elements and in which:

FIG. 3A is a top view of a cutting insert according to an aspect of the present invention, and FIGS. 3B-3E are side views of the insert of FIG. 3A;

FIG. 4A is a top view of a cutting insert according to an aspect of the present invention, FIG. 4B is a side view of the insert of FIG. 4A, and FIGS. 4C and 4D are partially sectional views taken at sections 4C-4C and 4D-4D of FIG. 4B

DETAILED DESCRIPTION

Figure 1A:
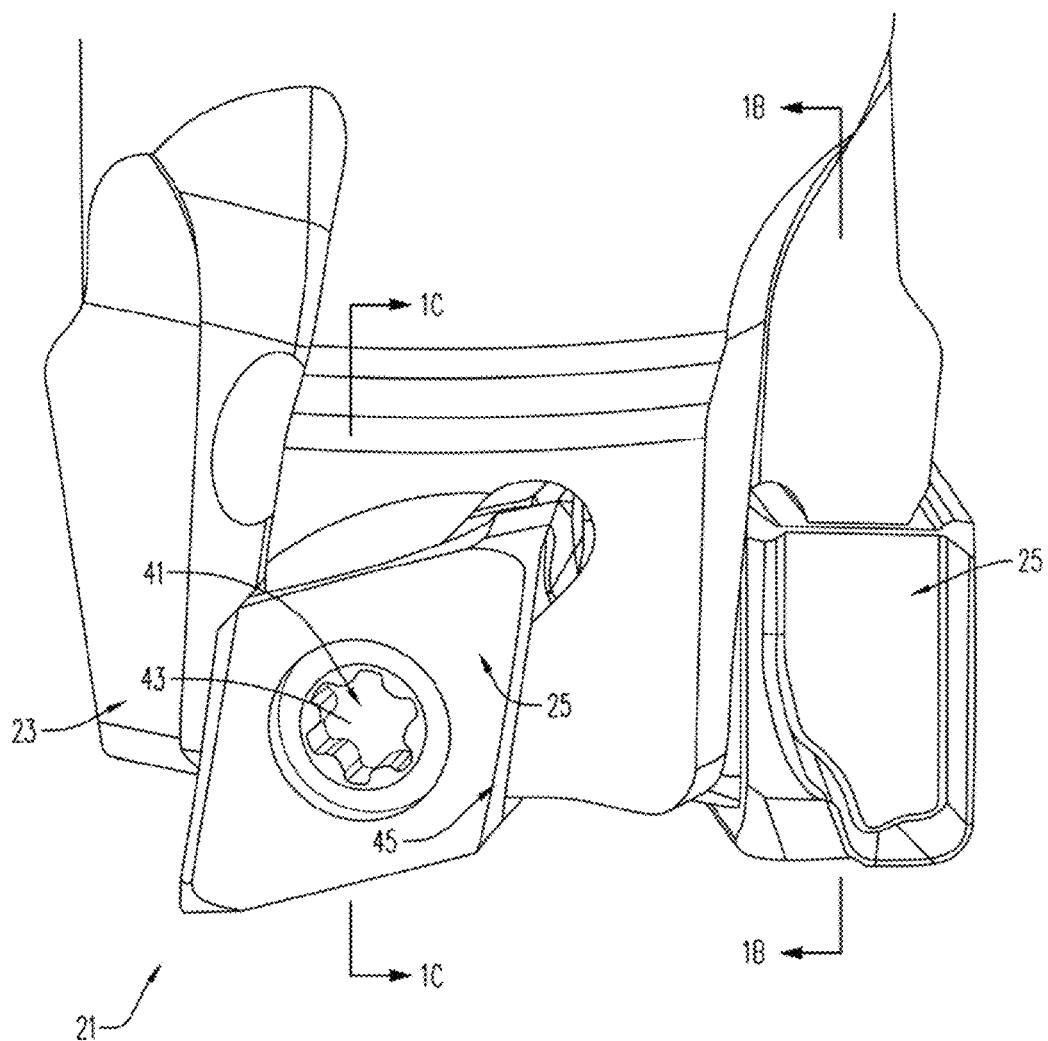
FIG. 1A is a perspective view of a portion of a cutting tool according to an aspect of the present invention.
Figure 1B:
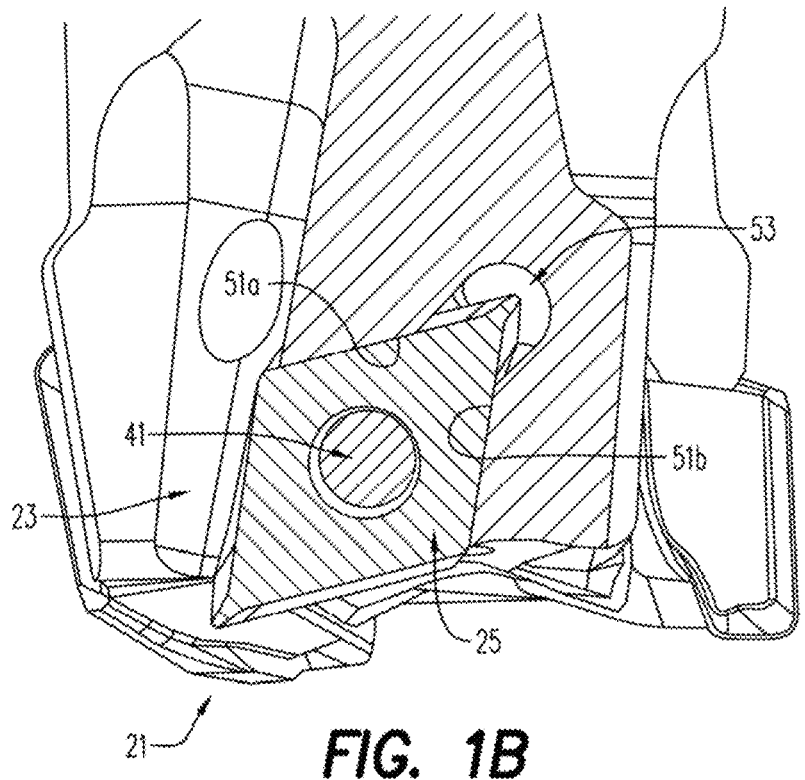
FIGS. 1B and 1C are partially sectional views taken at sections 1B-1B and 1C-1C of FIG. 1A.
Figure 1C:
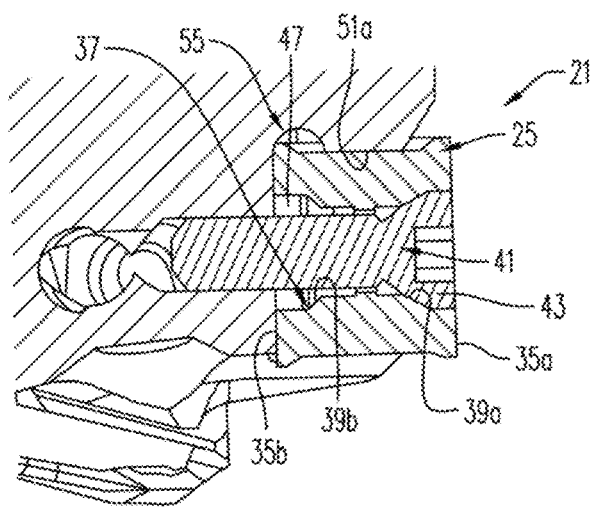
Figure 2:
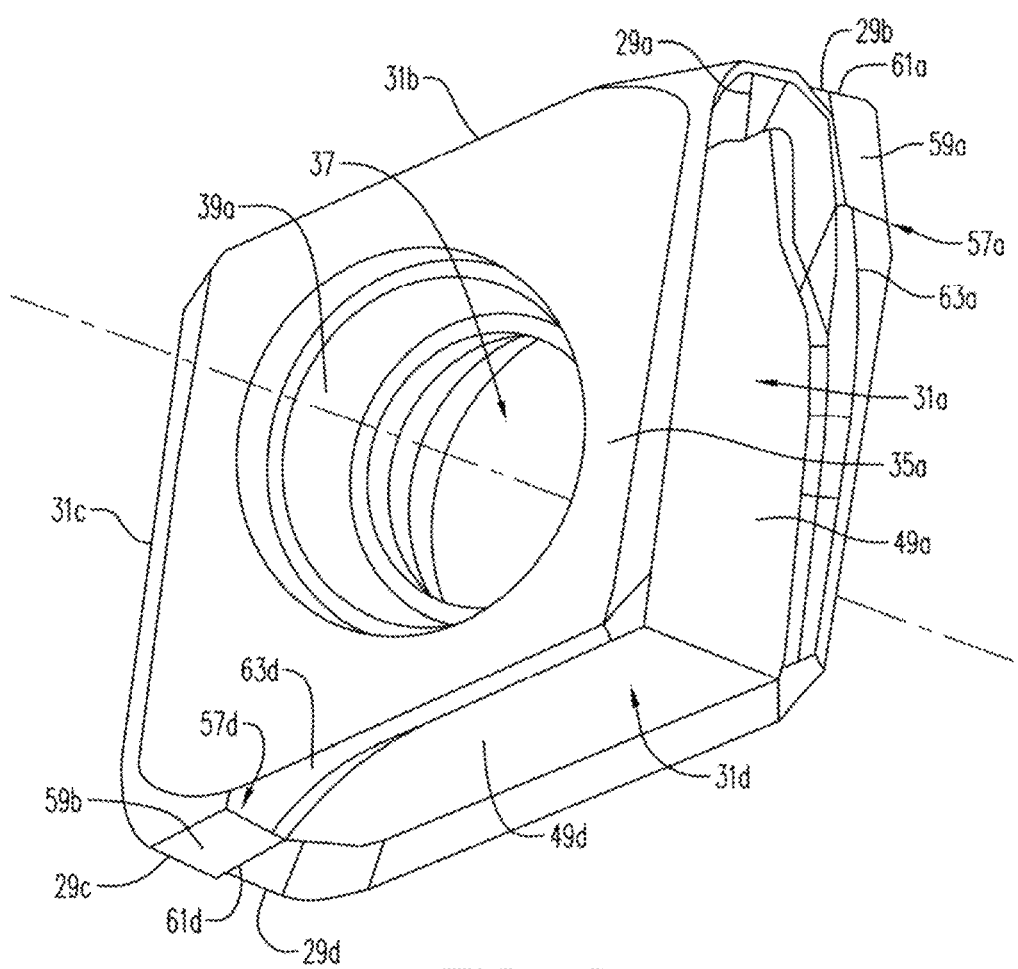
FIG. 2 is a perspective view of a cutting insert according to an aspect of the present invention.

FIGS. 1A-1C show portions of a cutting tool 21 according to an aspect of the present invention, including toolholder 23 and cutting inserts 25, mounted on the toolholder, according to further aspects. The particular tool 21 illustrated is a rotating tool, such as a milling tool, however, aspects of the present invention are applicable to other forms of tools, not necessarily limited to rotating tools. The inserts 25 are indexable to a plurality of different positions so that, when an exposed working edge of the insert becomes worn, the insert can be indexed to a different position to permit a different edge of the insert to be the working edge.

As seen, for example, in FIGS. 2 and 3A-3D, the cutting insert 25 comprises at least three, ordinarily four, cutting edges 27a, 27b, 27c, 27d. Each cutting edge 27a, 27b, 27c, 27d includes a primary cutting edge 29a, 29b, 29c, 29d, respectively, and each primary cutting edge is associated with a respective different side surface 31a, 31b, 31c, 31d of the cutting insert, respectively. Each side surface 31a, 31b, 31c, 31d has a respective rake surface 33a, 33b, 33c, 33d. The indexable cutting insert can be manufactured from directly pressed cemented carbide. By the term "cemented carbide" is here meant WC, TiC, TaC, NbC, etc., in sintered combination with a binder metal such as, for instance, Co or Ni. The cutting insert is preferably at least partly coated with layers of, e.g., $Al_2O_3$, TiN and/or TiCN. In certain cases, it may be justified that the cutting edges consist of soldered superhard materials such as CBN or PCD.

The cutting insert 25 ordinarily comprises six sides, of which four comprise the side surfaces 31a, 31b, 31c, 31d, and the other two comprise a first side supporting surface 35a and a second, opposite side supporting surface 35b. A through hole 37 extends into and between each side supporting surface 35a, 35b. The through hole 37 is tapered inwardly from proximate the first side toward the second side and from the second side to the first side so that two clamping surfaces 39a and 39b are formed. As seen in FIG. 1C, the insert 25 is clamped relative to the toolholder 23 by a bolt 41 having a head 43 that abuts one of the clamping surfaces and a threaded end that mates with threads in the toolholder.

The toolholder 23 includes a recess 45 in which each insert 25 is mounted. As seen in FIG. 1C, each recess includes an abutment surface 47 for abutting one of the side supporting surfaces 35a or 35b of the insert 25. Each side surface 31a, 31b, 31c, 31d has a respective side supporting surface portions 49a, 49b, 49c, 49d (seen in, e.g., FIGS. 3A-3E) and, as seen in FIG. 1B, each recess also includes first and second side abutment surfaces 51a and 51b for abutting two of the side supporting surface portions so that, when one of the side supporting surfaces 35a or 35b abuts the abutment surface 47, the insert 25 is supported along three sides. As seen in FIGS. 1A and 1B, a recess 53 is ordinarily provided between the first and second side abutment surfaces 51a and 51b and, as seen in FIG. 1C, a recess 55 is provided between the abutment surface 47 and the first and second side abutment surfaces so that portions of the insert not in use such as cutting edges are held out of contact with surfaces of the toolholder, thereby minimizing the risk of damage to such portions.

The drawings show an insert 25 that, for purposes of the present discussion, shall be referred to as a "right-handed" insert. An insert may be provided that is otherwise identical to the insert shown in the drawings except that it is "left-handed" and is a substantial mirror image of the insert shown in the drawings. A left-handed insert will ordinarily be used in the same applications as a right-handed insert, except that the direction of rotation of the cutting tool with which it is used will ordinarily be opposite that of a tool using right-handed inserts.

Each primary cutting edge 29a, 29b, 29c, 29d is disposed at an intersection of two side surfaces, a first one of the two side surfaces being the respective side surface associated with the primary cutting edge and a second one of the two side surfaces comprising a rake surface associated with another cutting edge and a clearance surface 57a, 57b, 57c, 57d associated with a respective side surface 31a, 31b, 31c, 31d. For example, as seen with reference to FIGS. 2 and 3A-3C the primary edge 29a is disposed at the intersection of its respective side surface 31a and the side surface 31b that "follows" the primary edge 29a as the tool 21 (seen in FIGS. 1A-1B) rotates around its axis and that comprises the rake surface 33b and the clearance surface 57b; the primary edge 29b is disposed at the intersection of its respective side surface 31b and the side surface 31a that follows the primary edge 29b and that comprises the rake surface 33a and the clearance surface 57a; the primary edge 29c is disposed at the intersection of its respective side surface 31c and the side surface 31d that follows the primary edge 29c and that comprises the rake surface 33d and the clearance surface 57d; and the primary edge 29d is disposed at the intersection of its respective side surface 31d and the side surface 31c that follows the primary edge 29d and comprises the rake surface 33c and the clearance surface 57c.

In each side surface 31a, 31b, 31c, 31d, the respective clearance surface 57a, 57b, 57c, 57d is elevated relative to the respective rake surface 33a, 33b, 33c, 33d. For each primary cutting edge 29a, 29b, 29c, 29d, an upper portion 59b, 59a, 59d, 59c, respectively, of each second clearance surface 57b, 57a, 57d, 57c that "follows" the primary edge in the direction of cutting extends along an entire length of the primary cutting edge on the second or following side surface so that the primary edge is supported by substantial material. An end 61a, 61b, 61c, 61d of the upper portion 59a, 59b, 59c, 59d of each clearance surface 57a, 57b, 57c, 57d on the second side surface is disposed at the end 61b, 61a, 61d, 61c, respectively, of another upper portion 59b, 59a, 59d, 59c, respectively, of another clearance surface 57b, 57a, 57d, 57c on the first side surface.

Each clearance surface 57a, 57b, 57c, 57d includes an upper portion 59a, 59b, 59c, 59d and a lower portion 63a, 63b, 63c, 63d. The lower portion 63a, 63b, 63c, 63d is ordinarily parallel or substantially parallel with a plane of the side surface 31a, 31b, 31c, 31d, respectively, as is the side supporting surface 49a, 49b, 49c, 49d. As seen for example, in FIG. 4C, the planes Pa and Pb of the first and second side surfaces 31a and 31b form an acute angle B. The angle A is measured between the plane Pa of the first side surface and an upper portion 59b (in phantom) of the clearance surface 57b. In one aspect of the invention, the angle A is about 10° greater than the angle B. Stated otherwise, the upper portions 59a, 59b, 59c, 59d of the clearance surfaces 57a, 57b, 57c, 57d of a following or second side surface forms a first angle A with a plane Pa of the respective side surface, and a lower portion 63a, 63b, 63c, 63d of the clearance surface forms a second angle B with the plane Pa of the respective surface. The reference to the plane of a side surface is not intended to mean that the side surface is planar but, rather, the plane is an imaginary reference plane. As seen, for example, in FIG. 4B, the upper portion 59d of each clearance surface 57d extends a first distance d1 along the primary cutting edge 29c, and a lower portion 63d of the clearance surface extends a second distance d2 along the primary cutting edge. The second distance d2 is ordinarily less than the first distance d1 so that an ample portion of the side surface 31d is available for use as a side supporting surface 49d.

As seen in FIGS. 3A-3D, each primary cutting edge 29a, 29b, 29c, 29d is associated with a secondary cutting edge 65a, 65b, 65c, 65d defining a cutting corner with the primary cutting edge. Each secondary cutting edge 65a, 65b, 65c, 65d is disposed at an intersection of a respective side surface 31a, 31b, 31c, 31d and a side supporting surface 35a or 35b. As seen in FIG. 4D, showing the secondary cutting edge 65d, each secondary cutting edge can include a chamfer portion 67 and a rake portion 69. The chamfer portion 67 can be useful for providing strength to the secondary cutting edge 65d and, in an aspect of the invention, forms an angle of about 20° with a plane of the adjacent side supporting surface 35b. As seen, for example, in FIG. 4A, a chamfer 69 can be provided inward from the side supporting surface 35a (or 35b, not shown in FIG. 4A) proximate each cutting corner formed by the primary and secondary cutting edges to provide additional clearance and strength. Aside from chamfers 67 and 69, and the though hole 37, each side supporting surface 35a and 35b is ordinarily substantially flat to facilitate stable mounting relative to the toolholder 23. FIG. 4A also shows that an angle X measured between, for example, the upper portions 59a and 59b of clearance surfaces 57a and 57b by the primary cutting edges 29b and 29a is larger than an angle Y measured between the plane Pb and the upper portion 59b of the clearance surface 57b, which is, in turn, larger than the angle Z between the planes Pa and Pb of the two side surfaces (31a and 31b, not shown in FIG. 4A).

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 10007763.5, from which this application claims priority, are incorporated herein by reference.

The invention claimed is:

1. A cutting insert comprising four cutting edges, each cutting edge including a primary cutting edge, each primary cutting edge being associated with a respective different side surface of the cutting insert, each side surface having a respective rake surface, each primary cutting edge being disposed at an intersection of two side surfaces, a first one of the two side surfaces being the respective side surface associated with the primary cutting edge and a second one of the two side surfaces comprising a rake surface associated with a second primary cutting edge and a clearance surface, the primary cutting edge and the second primary cutting edge each being disposed at an intersection of the first and second ones of the two side surfaces, and planes of the first and second ones of the two side surfaces defining an acute angle, and wherein an upper portion of the clearance surface on the second side surface extends a first distance along the primary cutting edge, and a lower portion of the clearance surface on the second side surface extends a second distance along the primary cutting edge, and the second distance is less than the first distance, and the insert having a generally convex quadrilateral shape comprising four corners comprising two convex acute corners and two convex obtuse corners when viewed along an axis generally parallel to planes of the first and second ones of the two side surfaces.

2. A cutting insert comprising four cutting edges, each cutting edge including a primary cutting edge, each primary cutting edge being associated with a respective different side surface of the cutting insert, each side surface having a respective rake surface, each primary cutting edge being disposed at an intersection of two side surfaces, a first one of the two side surfaces being the respective side surface associated with the primary cutting edge and a second one of the two side surfaces comprising a rake surface associated with a second primary cutting edge and a clearance surface, the primary cutting edge and the second primary cutting edge each being disposed at an intersection of the first and second ones of the two side surfaces, and planes of the first and second ones of the two side surfaces defining an acute angle, and wherein an upper portion of the clearance surface on the second side surface extends a first distance along the primary cutting edge, and a lower portion of the clearance surface on the second side surface extends a second distance along the primary cutting edge, and the second distance is less than the first distance, wherein the cutting insert comprises six sides, a through hole extending from a first side supporting surface to a second, opposite side supporting surface, and the insert having a generally convex quadrilateral shape comprising four corners comprising two convex acute corners and two convex obtuse corners when viewed along an axis generally parallel to planes of the first and second ones of the two side surfaces.

3. The cutting insert as set forth in claim 2, wherein the through hole is tapered inwardly from proximate the first side supporting surface toward the second side supporting surface and from proximate the second side surface to the first side.

4. The cutting insert as set forth in claim 1, wherein, in the second side surface, the clearance surface is elevated relative to the rake surface.

5. The cutting insert as set forth in claim 1, wherein, in the second side surface, the upper portion of the clearance surface adjacent the primary cutting edge extends along an entire length of the primary cutting edge on the second side surface.

6. The cutting insert as set forth in claim 1, wherein an end of the upper portion of the clearance surface on the second side surface is disposed at the end of another upper portion of another clearance surface on the first side surface.

7. The cutting insert as set forth in claim 1, wherein the upper portion of the clearance surface on the second side surface forms a first angle with a plane of the first side surface, and a lower portion of the clearance surface on the second side surface forms a second angle with the plane of the first side surface.

8. The cutting insert as set forth in claim 1, wherein each primary cutting edge is associated with a secondary cutting edge defining a cutting corner with the primary cutting edge.

9. The cutting insert as set forth in claim 8, wherein each secondary cutting edge disposed at an intersection of a side surface and a side supporting surface.

10. The cutting insert as set forth in claim 1, wherein each side supporting surface is substantially flat.

11. The cutting insert as set forth in claim 10, wherein a through hole extends into each side supporting surface.

12. The cutting insert as set forth in claim 2, wherein, in the second side surface, the clearance surface is elevated relative to the rake surface.

13. The cutting insert as set forth in claim 2, wherein, in the second side surface, the upper portion of the clearance surface adjacent the primary cutting edge extends along an entire length of the primary cutting edge on the second side surface.

14. The cutting insert as set forth in claim 2, wherein an end of the upper portion of the clearance surface on the second side surface is disposed at the end of another upper portion of another clearance surface on the first side surface.

15. The cutting insert as set forth in claim 2, wherein the upper portion of the clearance surface on the second side surface forms a first angle with a plane of the first side surface, and a lower portion of the clearance surface on the second side surface forms a second angle with the plane of the first side surface.

16. The cutting insert as set forth in claim 3, wherein, in the second side surface, the clearance surface is elevated relative to the rake surface.

17. The cutting insert as set forth in claim 3, wherein, in the second side surface, the upper portion of the clearance surface adjacent the primary cutting edge extends along an entire length of the primary cutting edge on the second side surface.

18. The cutting insert as set forth in claim 3, wherein an end of the upper portion of the clearance surface on the second side surface is disposed at the end of another upper portion of another clearance surface on the first side surface.

19. The cutting insert as set forth in claim 3, wherein the upper portion of the clearance surface on the second side surface firms a first angle with a plane of the first side surface, and a lower portion of the clearance surface on the second side surface forms a second angle with the plane of the first side surface.

* * * * *